March 22, 1960 A. SCHWARZ 2,929,396
SHAFTLESS VALVE STRUCTURES
Filed May 26, 1954

INVENTOR
Adolf Schwarz
BY
ATTORNEY

United States Patent Office 2,929,396
Patented Mar. 22, 1960

2,929,396

SHAFTLESS VALVE STRUCTURES

Adolf Schwarz, Lockport, N.Y., assignor to General Motors Corporation, Detroit, Mich., a corporation of Delaware Application May 26, 1954, Serial No. 432,401

2 Claims. (Cl. 137—315)

This invention relates to valve structures and more particularly to valve structures of the shaftless butterfly valve type.

Butterfly type valves are usually well balanced and easily operated and, therefore, are used extensively in numerous installations in which a variable flow of fluid must be controlled such as in those instances wherein a change in temperature of the fluid is instrumental in operating the valve. When such valves are mounted on pivot shafts as has been customary heretofore, they are relatively costly to manufacture. An improved valve has been developed of this general type which does not employ a shaft, but elimination of the shaft has brought about a condition wherein the bearing surface for the valve is reduced to a minimum and what amounts to a sharp edge. This condition gives rise to wear and possible erratic action in opening and closing of the valve. Smooth and consistent opening and closing movements are, of course, desirable if accurate seating of the valve and long life are to be obtained.

An object of the present invention is to provide an improved butterfly valve structure of the shaftless type which will operate to seat accurately during extended periods of operation.

Another object is to provide a butterfly valve structure which is simple in construction, may be easily assembled and which may be manufactured at a low cost.

These and other important features of the invention and novel combinations of parts will now be described in detail and then pointed out more particularly in the appended claims.

Figure 1:
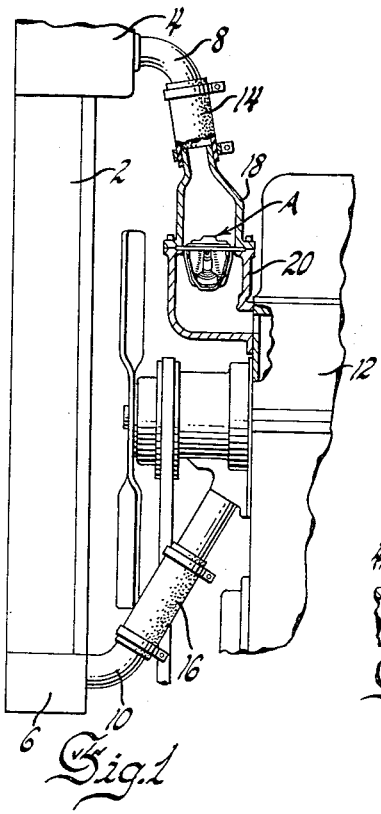
Fig. 1 is a view in elevation of a thermostatic valve as installed in the water circulatory system of an automobile engine, parts of the circulatory system being broken away to show a valve embodying features of the present invention.
Figure 2:
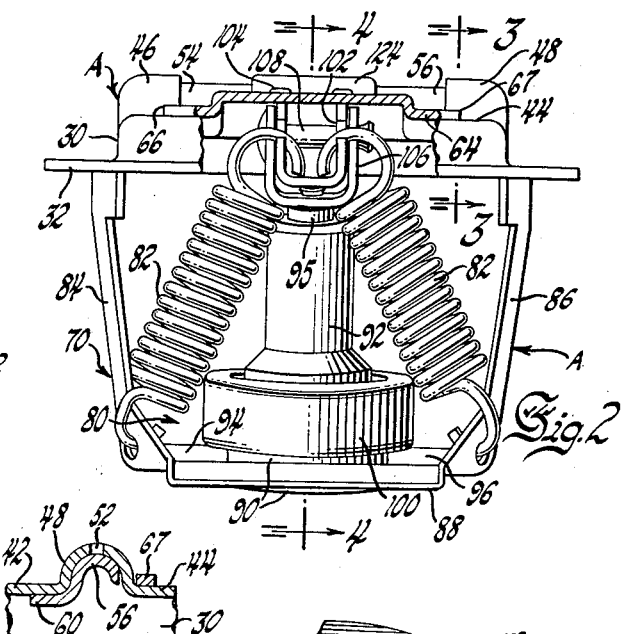
Fig. 2 is an enlarged elevational view of the valve structure shown in Fig. 1 with some parts broken away for clarity of illustration.
Figure 3:
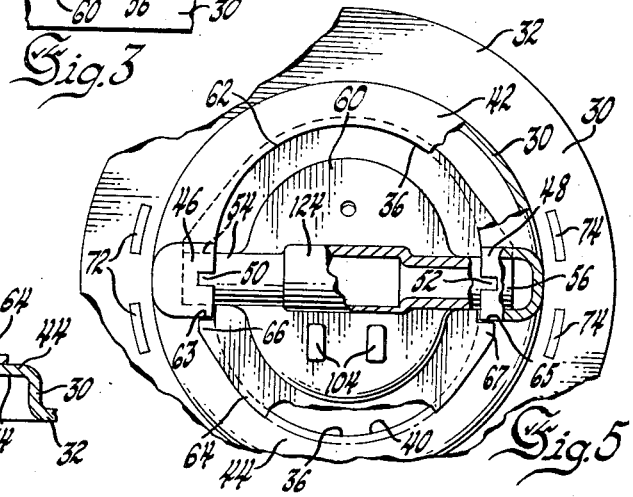
Fig. 3 is a sectional view taken along the line 3—3 in Fig. 2.

With reference to Fig. 1, a conventional water circulatory system for an automobile engine is shown comprising a radiator core 2, having an upper tank 4, a lower tank 6 connected thereto, inlet and outlet fittings 8 and 10, the water jacket 12 of an internal combustion engine, hose connections 14 and 16 and two axially aligned pipe connections 18 and 20. This conventional arrangement permits water to flow from the jacket 12, through the fitting 20, 18, down through the core 2 and back into the jacket 12.

Figure 5:
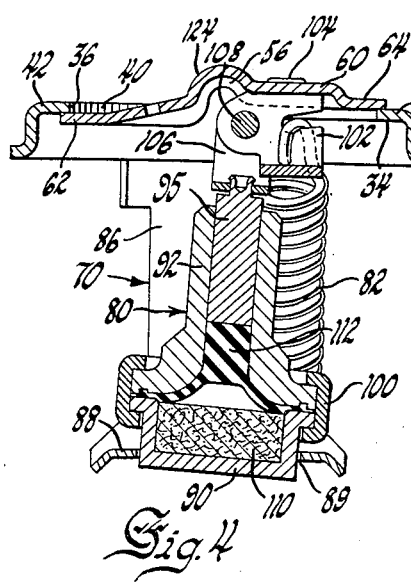
Fig. 5 is a plan view of the valve structure shown in Fig. 2 with parts broken away.

Suspended in the flow passage of the system and located within the two connections 18 and 20 is a thermostatically operated butterfly valve A. The valve structure A comprises a valve seat member 30 having a cylindrical outer flange 32 which is adapted to be clamped between the axially aligned flanged ends of the pipe connections 18 and 20. The valve seat member is dished as at 34 to form a substantially flat valve seat with an inwardly extending edge 36 defining an oval-shaped opening 40 therein as best seen in Fig. 5. The seat member 30 has oppositely extending portions 42 and 44 with those portions connected by arcuate bearing portions 46 and 48 disposed at opposite sides of the opening 40. Each of the arcuate bearing portions 46 and 48 is closed at its outer end and is slotted at its inner edge as at 50 or 52.

Journaled and concentrically arranged within the arcuate connecting portions 46 and 48 are arcuate trunnions or spaced coaxial portions 54 and 56 which are integral with a valve element 60.

A curved marginal portion 62 of the valve element 60 is adapted to fit or engage the under side of the portion 42 of the valve seat member 30 and an oppositely extending and curved marginal portion 64 of the valve element 60 is arranged to overlap the portion 44 of the valve seat member. Notches 63 and 65 are formed in opposite sides of the element 60 for registry with the inner edges of the arcuate portions 46 and 48. Because of these notches, the element presents two projections 66 and 67.

A U-shaped frame 70 is suspended from the flange 32 and is attached thereto by prongs or tabs 72 and 74. These prongs extend through the flange 32 and are peened over to provide a firm attachment. The frame 70 consists of spaced and upwardly and outwardly inclined arms 84 and 86 which are connected at their lower ends by a web 88. The upper ends of the arms 84 and 86 are provided with the tabs 72 and 74 above referred to and which are fixed to the flange 32. The web portion 88 of the frame 70 is provided with an opening 89 centrally thereof through which a cup-shaped pellet-receiving container 90 of a valve operating unit 80 is loosely received. Extending upwardly from the container 90 is a cylinder 92. Opposite sides of the web 88 are ridged as at 94 and 96 whereby oppositely disposed pivotal supports are provided for a securing band 100 which is part of the unit 80.

A U-shaped bracket 102 bears tabs 104 which are arranged to extend through the valve element 60 and are peened over to make the attachment secure. Slidably held within the cylinder 92 is a piston 95 the upper end of which is pivoted to an inverted U-shaped link member 106 which is pivoted by means of a pin 108 to the bracket 102. The lower end of each of two coil springs 82 is hooked to the frame 70 at the lower end of the associated arm 84 or 86. The upper ends of springs 82 are hooked to bracket 102. Springs 82 tend to hold the valve element 60 in its closed position.

Figure 4:
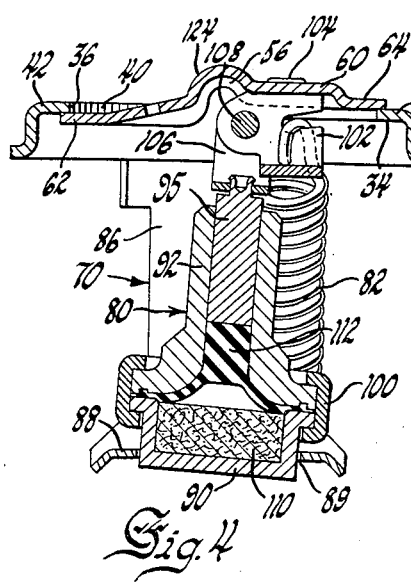
Fig. 4 is a sectional view taken along the line 4—4 in Fig. 2.
Figure 6:
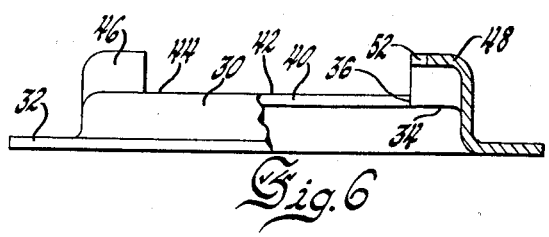
Fig. 6 is an elevation view of a flange member shown in Fig. 2 with a portion broken away better to show the construction.

Various means may be employed for opening and closing the valve element 60 and for further details regarding such a mechanism and of the type herein disclosed, reference may be had to the copending application Serial Number 319,282, now Patent No. 2,815,916, filed November 7, 1952, in the names of John R. Holmes, Harold A. Reynolds, and Adolph Schwarz and entitled "Thermostatically Operable Valve Structures." In such devices an expandable pellet 110 is employed to act against a plunger portion 112 which extends into the lower end of the cylinder 92 and abuts the lower end of the piston 95. When the pellet 110 expands, the plunger 95 overcomes the tension in the springs 82 and urges the valve element 60 upwardly. Because of the location of the pin 108 with respect to the axis of the trunnions 54 and 56, the valve is opened or swung counterclockwise from its closed position as viewed in Fig. 4. It is obvious from the drawings that the valve operating unit 80 serves not only to operate the valve but also retains the trunnions 54 and 56 in engagement with the arcuate bearing seats 46 and 48. The valve element 60 is formed with an enlarged arcuate central portion 124 which constitutes a stiffening means. This portion is in alignment with the arcuate trunnions 54 and 56 journaled within the arcuate portions 46 and 48 of the valve seat.

In assembling the valve element 60 on the valve seat member 30 the former is inserted through the opening 40 in the valve seat member in such a manner that the projections 66 and 67 pass through the slots 50 and 52 respectively. The valve element is then turned so that small arcuate portions of the edge 36 ride in slots 63 and 65 until the parts occupy the positions shown in Figs. 4 and 5. The arcuate trunnions 54 and 56 now engage arcuate bearing seats 46 and 48, and the valve is held for pivotal movement in said bearings.

From the above description it will be understood that large arcuate bearing surfaces are provided within the arcuate portions 46 and 48 to resist frictional wear when the valve element 60 is swung or moved from the open to closed positions or vice versa. Smooth operation is provided and long trouble-free periods of service are assured by such construction.

I claim:

1. A shaftless valve structure of the butterfly type comprising a valve seat member with a curved edge defining an opening, arcuate bearing portions formed in said seat member at opposite sides of said opening, a valve member in the form of a disk larger than said opening and having arcuate trunnion portions integral therewith and located within said arcuate bearing portions, said bearing portions having slots proportioned to receive marginal portions of said valve member during assembly of the structure, and single means for operating and retaining said valve member with said trunnion portions in engagement with said bearing portions whereby said opening may be controlled by said valve member.

2. A shaftless valve structure of the butterfly type comprising a valve seat member with a curved edge defining an opening, arcuate bearing portions formed in said seat member at opposite sides of said opening, a valve member in the form of a disk larger than said opening and having arcuate trunnion portions extending from one side and integral therewith and having the same axis as said arcuate bearing portions, said bearing portions having slots proportioned to receive marginal portions of said valve member during assembly of the structure, and single means including a bracket fixed to the other side of said valve member and means connected to said bracket and acting about said axis for operating and retaining said valve member with said trunnion portions in engagement with said bearing portions whereby said opening may be controlled by said valve member.

References Cited in the file of this patent

UNITED STATES PATENTS

| | | |
|---|---|---|
| 781,014 | O'Brien | Jan. 31, 1905 |
| 1,346,887 | Heald | July 20, 1920 |
| 2,493,736 | Brown | Jan. 10, 1950 |
| 2,569,359 | Vellinga | Sept. 25, 1951 |
| 2,656,113 | Drapeau | Oct. 20, 1953 |
| 2,742,051 | Chanda | Apr. 17, 1956 |
| 2,765,984 | Puster | Oct. 9, 1956 |